T. C. SPELLING.
MOUNTING FOR HORIZONTAL WHEELS.
APPLICATION FILED MAR. 18, 1916.
1,184,039.
Patented May 23, 1916.
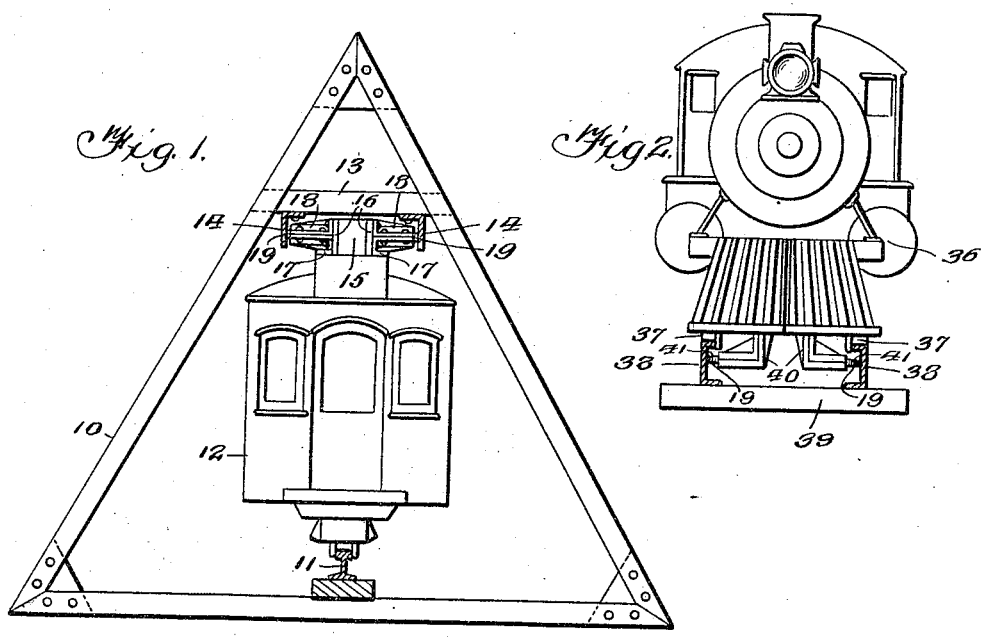
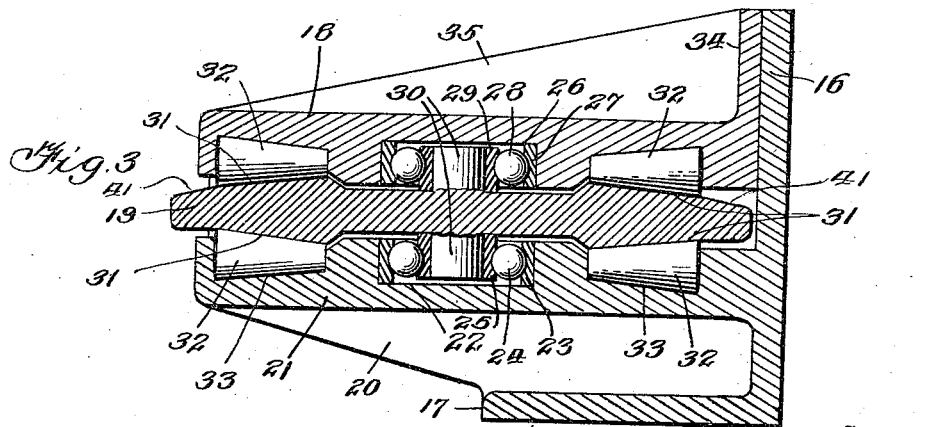
Witnesses to Signiture,
Thomas C. Spelling, Inventor

UNITED STATES PATENT OFFICE.

THOMAS C. SPELLING, OF NEW YORK, N. Y.

MOUNTING FOR HORIZONTAL WHEELS.

1,184,039.  Specification of Letters Patent.  Patented May 23, 1916.

Application filed March 18, 1916. Serial No. 85,103.

*To all whom it may concern:*

Be it known that I, THOMAS C. SPELLING, a citizen of the United States, and a resident of the city of New York, in the county of New York and State of New York, have invented certain new and useful Improvements in Mountings for Horizontal Wheels, of which the following is a specification.

This invention relates to wheel construction and mounting, and more particularly to the construction and mounting of a horizontal type of wheel for use on railway trains.

It has for an object to provide a wheel mounted upon a vertical axis to maintain the equilibrium of a monorail train, or for mounting below the truck of a car to prevent derailment of the car.

A further object is to provide a horizontal wheel having a bearing to afford a mounting for rotation, and also having supplemental roller bearings disposed near the periphery of the wheel to prevent vibration of the wheel.

Further objects will be apparent from the following specification, appended claims, and drawings, in which, Figure 1 is an elevation of a monorail train showing the wheel carried thereby, Fig. 2 is an elevation of a locomotive showing the wheel mounted below the truck to prevent derailment, and Fig. 3 is a vertical sectional view through the wheel and associated parts.

This wheel is intended for use on railway trains, and may be used equally as well on a monorail train as on a train of ordinary construction, and the construction of this wheel is such as to provide a secure support for the axis of the wheel, and for the further provision of roller bearings to stabilize the wheel near its periphery to prevent vibration or distortion.

Referring to the drawings, there is shown a triangular frame 10 which supports a stringer on which a rail 11 is secured, and on this rail is mounted a car 12 of the monorail type. The frame 10 has a cross piece 13 secured thereto to which are secured, the angle rails 14, which may be grooved to afford guides for wheels to be described, or they may be of plain construction, allowing the wheels to find their line of travel any where along the flanges.

The car has a frame 15 secured thereto, to which, flanges 16 may be detachably secured, and the supplemental flanges 17 may be attached to the car as shown. The flanges 16 and 17 are formed on one half of a casing in which a wheel is journaled, and to this half is secured another half 18. The halves of the casing have flanges formed thereon which meet when the two parts are assembled to receive bolts or other fastening means to provide a relatively solid structure, and rotatably mounted between these halves is a wheel 19.

As shown in Fig. 1, the casings and wheels 19 are arranged in pairs on a car to maintain the car in the desired position which is vertical on tangents, and at the desired pitch on curves and the rails may be spaced to allow freedom of movement of the wheels when the equilibrium of the car may be maintained without the use of these wheels.

The detailed construction of each wheel and its casing is substantially as follows. The flanges 16 and 17 afford anchorage for fastening to the frame of a car, and these flanges are connected to a web 20 which supports a face plate 21, in which a recess 22 is formed to receive the outer ring 23 of a ball bearing including the balls 24 and the inner ring 25. The casing 18 also comprises a face plate which has a recess 26 formed therein to receive the outer ring 27 of a ball bearing which includes the balls 28 and inner ring 29. The rings 25 and 29 support the trunnions 30 of the wheel 19, and support the wheel for rotation about its axis, but the wheel is further supported in having the beveled faces 31 formed thereon which engage the tapered rollers 32, which also engage the beveled faces 33 formed in the face plates 21 and 18. The section 18 has a flange 34 formed thereon for attachment to the extension of the flange 16, and a web 35 is formed on this section to produce a rigid structure.

In Fig. 2, the wheel is carried by a locomotive of usual construction and serves to prevent the wheels from leaving the rails when the car is going around curves at high speeds; also protect the interior sides of the rails from abrasions. There is shown a locomotive 36 mounted upon the wheels 37, and these wheels run on the rails 38 which are departures from the ordinary types in being channel rails set upon one flange, and using the opposite flange for a tread to support the car wheels. The rails 38 may be placed upon stringers running longitudinally with the rails, or upon crossties 39, but in the latter instance, a fewer number of ties will be needed as the rail structure is of a girder formation and may span a greater distance.

The truck of the locomotive has the depending brackets 40 formed thereon and to the brackets, the casings and wheels 19 are secured.

It is apparent that for use in connection with railway trains, a wheel of this class must possess freedom of movement, and must also be stable in its rotation to serve its purpose without establishing a counter action, and when the trains are to run at high speeds, it is necessary that the mountings of the wheels be such as not to interfere with the speed of the train by creating a distortion of the wheel to damage the rails or allow the wheels to vibrate under the strains exerted upon these wheels.

When the roller is used in connection with the truck as shown in Fig. 3, it is necessary to provide for a line of contact between the wheel 19 and the flange of the rail 38 so as to prevent a great surface of the exposed part of the wheel 19 from bearing against the under face of this flange as would occur on the inner rail of a curve when the train is traveling at a high speed. For this I provide a beveled edge or face 41, about which, only a single line of contact will be had with the flange. This feature reduces the friction and also relieves the strain which would occur on the wheel if it did not rotate freely, and it is apparent that the frusto-conical surface always presents a rounded surface for contact with the flange instead of a shearing edge which would occur if the upper face of the wheel was flat.

It is thought that the foregoing description clearly defines each part, and gives its function in connection with the other parts, and that to those acquainted with this type of apparatus, the several applications of this wheel are apparent. Furthermore, no limitation is implied by the limited number of applications shown as this wheel may be used in any instance where a lateral strain is exerted in changing the course of travel of an object.

Having thus described my invention, I claim:

1. A horizontal wheel comprising a casing of separable halves, flanges formed on said halves, webs reinforcing said casings and flanges, a wheel journaled in said casing, bearings to support said wheel for free rotation in one plane, said halves of said casing and said wheel having bearing faces formed thereon between said first mentioned bearings and the periphery of said wheel, rollers mounted between said bearing faces of said casing and wheel, and said wheel extending beyond said casing for contact with a track.

2. A wheel construction of the class described, comprising a wheel journaled for free rotation on a vertical axis, a casing for said wheel, bearing surfaces formed on said wheel between the axis and periphery, and the edge of said wheel having a beveled face for contact with an overhanging surface.

3. In a horizontal wheel mounting, a casing comprising complemental halves, flanges formed about said halves, fastening means for holding said halves together, central bearings formed in said halves and bearing surfaces formed in said halves intermediate said central bearings and said flanges, a wheel rotatably mounted between said halves of said casing, said wheel having trunnions formed thereon for mounting in said central bearings, bearing surfaces formed on said wheel between the intermediate bearing surfaces of said halves, anti-friction rollers in bearing relation between the intermediate bearing surfaces of said halves, and the bearing surfaces on said wheel, said casing being cut away across one side to expose the periphery of said wheel, and said casing supporting said wheel about areas thereof to relieve said wheel of incidental strain.

4. In a horizontal wheel mounting, a casing of rigid construction comprising halves securely held together about the edges thereof, a wheel rotatably carried therein, central anti-friction bearings between said wheel and casing, trunnions extending from the sides of said wheel to receive said central bearings, and other anti-friction bearings formed adjacent the rim of said wheel, said second mentioned bearings occurring within said casing to establish rigidity between said wheel and casing, and said wheel having its periphery rounded and beveled to reduce the contact surface and present an inclined face against an overhanging rail.

Signed at New York, in the county of New York and State of New York, this 17th day of March, A. D. 1916.

THOMAS C. SPELLING.

Witnesses:
M. TOWNSEND RICE,
MOLLIE QUATENETZ.

Copies of this patent may be obtained for five cents each, by addressing the "Commissioner of Patents, Washington, D. C."